Nov. 17, 1925.                                                                1,562,243
M. MOELLER
APPARATUS FOR CONTINUOUSLY MEASURING THE COMBUSTIBLE
CONSTITUENTS OF WASTE GASES
Filed Nov. 22, 1924
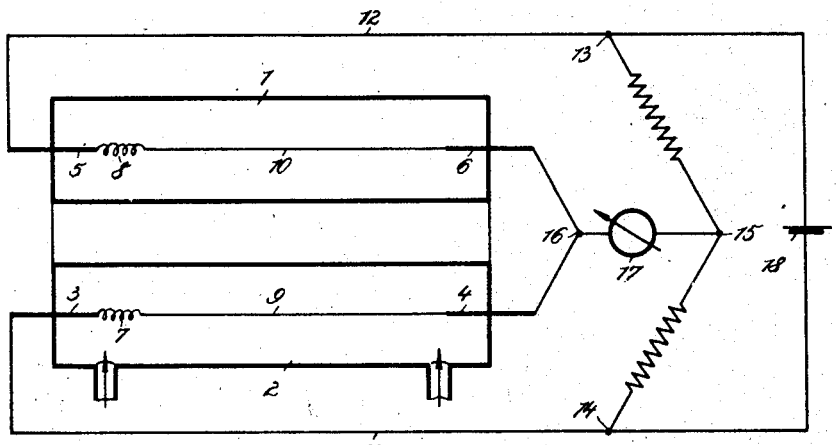
Inventor
Max Moeller
by Knight Bros
       Attorneys Patented Nov. 17, 1925.

1,562,243

UNITED STATES PATENT OFFICE.

MAX MOELLER, OF BERLIN, GERMANY, ASSIGNOR TO SIEMENS & HALSKE AKTIEN-GESELLSCHAFT, OF SIEMENSSTADT, NEAR BERLIN, GERMANY.

APPARATUS FOR CONTINUOUSLY MEASURING THE COMBUSTIBLE CONSTITUENTS OF WASTE GASES.

Application filed November 22, 1924. Serial No. 751,711.

*To all whom it may concern:*

Be it known that I, MAX MOELLER, a citizen of the German Empire, residing at Berlin, Germany, have invented certain new and useful Improvements in Apparatus for Continuously Measuring the Combustible Constituents of Waste Gases, of which the following is a specification.

My invention relates to improvements in apparatus for continuously measuring the combustible constituents of waste gases of furnaces or internal combustion engines.

In order to be able to supervise furnaces or internal combustion engines in regard to the completeness of the combustion of their fuel, apparatus has been provided which enable the waste gases to be tested in regard to their contents of combustible constituents.

My invention consists in providing for the continuous measurement of these combustible constituents an electrically heated catalytically acting wire which consists of an alloy containing at least one of the elements of the platinum group (including broadly platinum, iridium, osmium, palladium, ruthenium and rhodium) and which is so connected with a resistance measuring arrangement that its resistance can be read off on a measuring instrument or be recorded by said instrument. The temperature rises taking place in the wire when the combustible constituents of the waste gases are burned cause an increase of its electric resistance which is measured by one of the known arrangements such as a Wheatstone bridge and the values obtained are utilized as a measure for the combustible constituents still contained in the waste gas.

In the drawing affixed to this specification and forming part thereof an embodiment of my invention is diagrammatically illustrated by way of example.

Referring to this drawing 2 is a tube through which the waste gases to be examined are conducted while a tube 1 contains atmospheric air for comparison. Between the terminals 3 and 4 a platinum-iridium wire 9 and between the terminals 5 and 6 a platinum-iridium wire 10 is stretched and kept in a state of tension by the springs 7 and 8 respectively. The two wires 9 and 10 are with one end connected with the branching points 13 and 14 by the wires 11 and 12 and with their other end with the point 16 of a Wheatstone bridge arrangement. Besides the standard resistances between the points 13 and 15 and 14 and 15 the system contains a source of current 18 and a resistance measuring instrument 17 which may also be a recording instrument. In order that successive measurements should give uniform results and in particular that variations in the velocity of the flow of the waste gases and external temperature influences should have no disturbing effect on the apparatus it is necessary that the catalytically acting wire should always maintain the same distance from the walls of the tubes. On account of the stretching of the wire with the increase in temperature the wire must be subjected to such a preliminary tension that sagging is avoided with certainty whether the wire be stretched across in a straight line or whether it be in helical form. To fulfill these conditions a wire consisting of pure platinum would have to have a considerable cross-sectional area. The consequently comparatively low electric resistance of such a wire wound in itself require strong electric currents for its heating and the accuracy of the resistance measuring arrangement would be reduced. All these drawbacks are effectively obviated if a measuring wire consisting of an alloy containing at least one of the elements of the platinum group (for instance platinum-irridium or platinum-rhodium) is employed because such a wire has a considerably greater tensile strength and an about 4 to 8 times higher specific electric resistance.

Owing to the greater tensile strength thin measuring wires may be employed which is of importance in view of the high cost of the material in question. A considerable reduction in the consumption of current is furthermore attained since the resistance increases not only in consequence of the smaller cross-section but also in consequence of the electric properties of the material. In view of the fact that these apparatus are permanently connected in circuit a low current consumption is frequently decisive for their introduction into practical use. The resistance of the said alloys against chemical influences is also considerably greater than that of pure platinum which is a valuable feature in view of the chemically highly corrosive constituents of waste gases.

What I claim as my invention is:—

1. In a device for continuously measuring the combustible constituents of waste gases the combustion of a compartment filled with a suitable gas for comparison with the waste gases and containing a wire of suitable catalytically acting material surrounded by said comparison gas, a second compartment having an intake and a discharge opening for said waste gases, and containing a catalytically acting wire consisting of an alloy containing at least one of the elements of the platinum group, said wire being surrounded by said waste gases, a source of current and conductors for connecting said source with said catalytic wires, and a measuring instrument suitably connected in circuit with said wires for comparing the amount of current passing through said wires.

2. In a device for continuously measuring the combustible constituents of waste gases the combination of a compartment filled with a suitable gas for comparison with the waste gases and containing a wire of suitable catalytically acting material surrounded by said comparison gas, a second compartment having an intake and a discharge opening for said waste gases, and containing a catalytically acting wire consisting of an alloy containing at least one of the elements of the platinum group, said wire being surrounded by said waste gases, a source of current and conductors for connecting said source with said catalytic wires, and a measuring instrument connected in a Wheatstone bridge connection with said wires for comparing the amount of current passing through said wires.

In testimony whereof I affix my signature.

MAX MOELLER.